(12) United States Patent
Christenson et al.

(10) Patent No.: US 8,589,678 B2
(45) Date of Patent: Nov. 19, 2013

(54) MANAGING STATUS AND ACCESS FOR A VARIABLE SOURCE CONTENT STREAM

(75) Inventors: Steven Christenson, Campbell, CA (US); Eric Cozzi, Hayward, CA (US); Saad Malik, Milpitas, CA (US); Rajesh Basawa, San Jose, CA (US); Leonard Brzezinski, Redwood City, CA (US); Shmuel Shaffer, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 1355 days.

(21) Appl. No.: 11/761,799

(22) Filed: Jun. 12, 2007

(65) Prior Publication Data
US 2008/0313711 A1 Dec. 18, 2008

(51) Int. Cl.
*H04L 29/06* (2006.01)
(52) U.S. Cl.
USPC ............... 713/163; 713/153; 726/7; 725/87; 725/103; 725/110
(58) Field of Classification Search
USPC .............. 713/153, 163; 725/87, 103, 110, 11; 726/7
See application file for complete search history.

(56) References Cited

U.S. PATENT DOCUMENTS

| | | | |
|---|---|---|---|
| 6,654,367 B1 | 11/2003 | Kaufman | |
| 7,191,332 B1 * | 3/2007 | Pankajakshan et al. | 713/163 |
| 7,610,018 B2 * | 10/2009 | Marin et al. | 455/63.3 |
| 8,085,671 B2 * | 12/2011 | Shaffer et al. | 370/237 |
| 2003/0063752 A1 | 4/2003 | Medvinsky | |
| 2004/0151315 A1 | 8/2004 | Kim | |
| 2006/0050701 A1 | 3/2006 | Peterka et al. | |
| 2009/0320077 A1 * | 12/2009 | Gazdzinski | 725/62 |
| 2010/0246466 A1 | 9/2010 | Oliveira et al. | |

OTHER PUBLICATIONS

International Telecommunication Union, ITU-T Recommendation H.460.15: "Call Signaling Transport Channel Suspension and Redirection Within H.323 Systems", Geneva, Mar. 2004, pp. 1-15.*
H. Schulzrinne and S. Petrack, "RTP Payload for DTMF Digits, Telephony Tones and Telephony Signals", Network Working Group, RFC 2833, May 2000, 29 pages.
H. Schulzrinne and T. Taylor, "RTP Payload for DTMF Digits, Telephony Tones, and Telephony Signals", Network Working Group, RFC 4733, Dec. 2006, 46 pages.
C. Perkins, et al., "RTP Payload for Redundant Audio Data", Network Working Group, RFC 2198, Sep. 1997, 11 pages.

* cited by examiner

*Primary Examiner* — Eleni Shiferaw
*Assistant Examiner* — Paul Callahan
(74) *Attorney, Agent, or Firm* — Patent Capital Group

(57) ABSTRACT

In one embodiment, a method can include: receiving rules in an interoperability server, the rules being related to access control for an endpoint coupled to a variable source content stream via a multicast network; and sending to the endpoint using in-band controls of the variable source content stream via the multicast network: a description of content streams available for selection by the endpoint; a procedure for selecting an available content stream; and permission for accessing the selected content stream, the permission being based on the rules.

25 Claims, 7 Drawing Sheets

MANAGING STATUS AND ACCESS FOR A VARIABLE SOURCE CONTENT STREAM

TECHNICAL FIELD

The present disclosure relates generally to accessing and managing the status of a variable source content stream.

BACKGROUND

In interoperability and compatibility systems, where radios may be tunable to multiple different over-the-air frequencies, the sharing of such radio resources may be problematic. For example, privacy maintenance and access control may be difficult to implement. In some conventional approaches, signals may be encrypted in order to accommodate privacy. However, such approaches may not allow for both control and notification of a variable source content stream.

DESCRIPTION OF EXAMPLE EMBODIMENTS

Overview

In one embodiment, a method can include: receiving rules in an interoperability server, the rules being related to access control for an endpoint coupled to a variable source content stream via a multicast network; and sending to the endpoint using in-band controls of the variable source content stream via the multicast network: a description of content streams available for selection by the endpoint; a procedure for selecting an available content stream; and permission for accessing the selected content stream, the permission being based on the rules.

In one embodiment, a method can include: receiving notification in an endpoint coupled to a multicast network, the notification using in-band controls and indicating a change in content stream selection; determining a permission related to the selected content stream; and disabling access to the selected content stream in the endpoint when the endpoint lacks permission for accessing the selected content stream.

In one embodiment, an apparatus can include: one or more processors; and logic encoded in one or more tangible media for execution by the one or more processors, and when executed operable to: receive rules in an interoperability server, the rules being related to access controls for an endpoint coupled to a variable source content stream via a multicast network; and send to the endpoint using in-band controls of the variable source content stream via the multicast network: a description of content streams available for selection by the endpoint; a procedure for selecting an available content stream; and permission for accessing the selected content stream, the permission being based on the rules.

In one embodiment, an apparatus can include: one or more processors; and logic encoded in one or more tangible media for execution by the one or more processors, and when executed operable to: receive notification in an endpoint coupled to a multicast network, the notification using in-band controls and indicating a change in content stream selection; determine a permission related to the selected content stream; and disable access to the selected content stream in the endpoint when the endpoint lacks permission for accessing the selected content stream.

Example Embodiments

Figure 1:
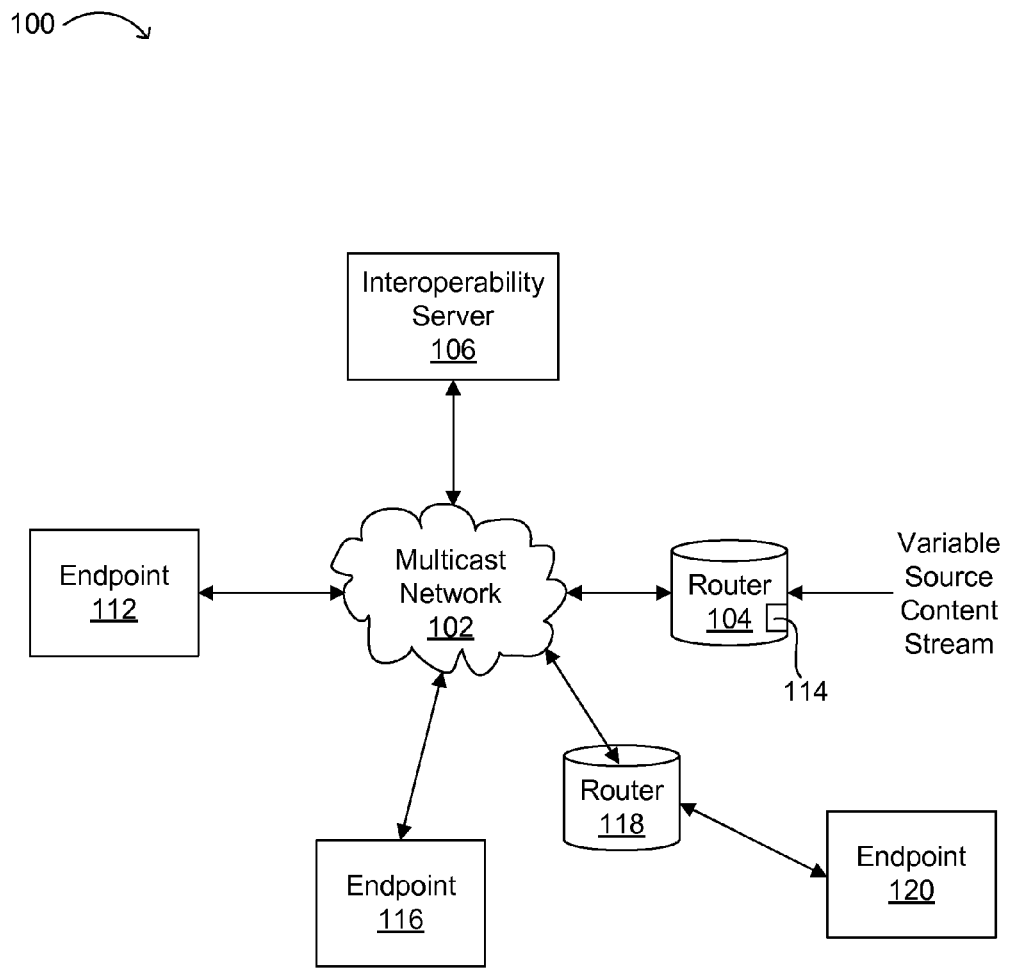
FIG. 1 illustrates an example variable source content stream management system.

Referring now to FIG. 1, an example variable source content stream management system is shown and indicated by the general reference character 100. In this example, multicast network 102 can interface with routers 104 and 118, interoperability server 106, and endpoints 112 and 116. Also, router 118 can interface with endpoint 120 and multicast network 102. Router 104 may also be equipped with or coupled to gateway 114 for conversion between a variable source content stream and Internet protocol (IP). For example, gateway 114 may be a land mobile radio gateway (LMRG). In addition, interoperability server 106 may store rules for endpoint access of content streams, and may manage associated protocols. Such rules may generally include content stream access permissions for each endpoint, but can also include any other suitable endpoint configuration relating to such streams.

A variable source content stream can be any appropriate data stream (e.g., IP TV, or radio) with selectable content. Also, endpoints 112, 116, and 120 may be any suitable endpoint structures, such as devices configured with an IP application and/or push to talk (PTT) management centers or clients. In an audio-based example, certain endpoints may not be allowed to hear or otherwise access a stream, which may be provided from the same "pipe" containing the variable source content stream, and disseminated via multicast network 102. Encryption may be utilized to prevent unauthorized listening, but particular embodiments can allow for advanced warning of any such encryption. Also, other endpoints may be coupled to any of endpoints 112, 116, and 120 via a unicast network.

Generally, particular embodiments can be utilized for any content that can flow in a multicast network or similar such distribution mechanism (e.g., a conferencing system). Enforcement of permissions for accessing (e.g., listening to, or providing audio using a PTT approach) a content stream can occur at either an application level or a network level, where the client or endpoint may be so tasked. In particular embodiments, synchronous control and scalability can be realized by using control sequences that are "in-band" with the content stream. For example, a predetermined payload type can be used to indicate that subsequent packets are to be ignored by endpoints with insufficient permission. Further, endpoints may be controlled, and an application may be distributed such that the clients or endpoints can be instructed to ignore such packets in particular embodiments.

In particular embodiments, users can deploy "controlled" radio solutions where the radio can be changed to one of many over-the-air frequencies at any given time. The output of the radio may then be a single multicast stream corresponding to the selected source frequency. Some listeners may have permission to select which of the over-the-air frequencies are streamed. However, such a change initiated from permissible listeners can affect all other listeners due to the sharing of the variable source content stream. Further, affected listeners may not know or may not be permitted to know the source and/or content of the stream.

Of course, radio frequency may only be one determinant in stream selection in particular embodiments. For example, stream selection can be based on phase lock (PL) tone, talk group, unit ID, digital coded squelch (DCS), continuous tone-coded squelch system (CTCSS), or any suitable selection determinant. Accordingly, particular embodiments can allow for: (i) determining which one of the possible content sources are present in the stream; (ii) switching the content source dynamically if authorized, with the knowledge of all participants; (iii) restricting or allowing play-out of content based on privilege; and (iv) displaying to the listener which stream is currently active, or inhibiting such display when not permitted.

Figure 2:
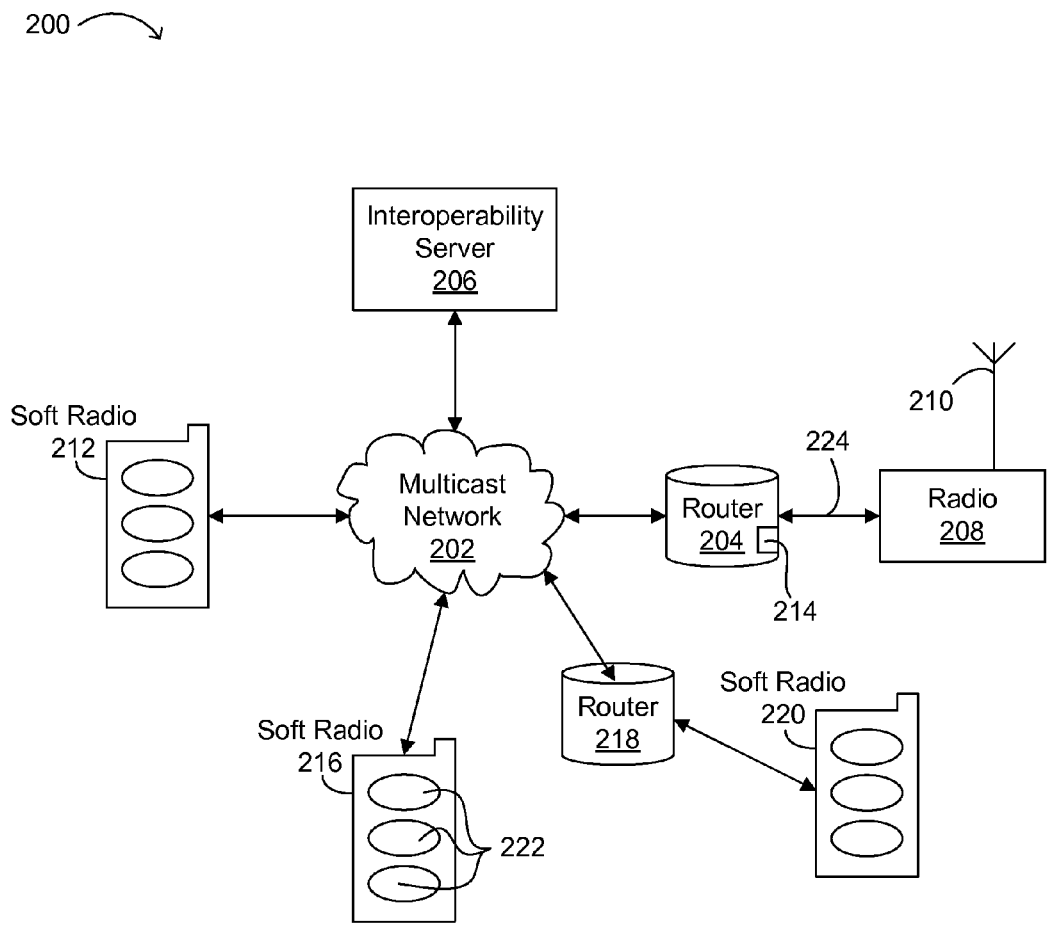
FIG. 2 illustrates an example radio application using a multicast network.

Referring now to FIG. 2, an example radio application using a multicast network is shown and indicated by the general reference character 200. In this particular example, the endpoints may be devices configured using an IP application as "soft" radios or devices that use local rendering to approximate traditional radio operation (e.g., 212, 216, and 220). For example, each such soft radio can include channel indications 222. As shown, multicast network 202 can also interface with interoperability server 206, and routers 204 and 218. Radio 208 may be a physical base station radio with antenna 210. Audio from radio 208 can pass over a single line or connection (e.g., content stream 224) through router 204. For example, router 204 can include or be coupled to LMRG 214 for conversion from content stream 224 to IP signaling.

In particular embodiments, in-band commands may be sent over multicast network 202 through LMRG 214 to radio 208. For example, radio 208 can receive a new content stream selection command from soft radio 212, and then switch from channel "1" to channel "2." However, soft radios 216 and 220, because they are coupled to multicast network 202, can receive the same command. Thus for example, command "1231" may be sent when a user pushes a button, and other soft radios can know that particular command equates to switching to channel 2. Thus, any one user can change the channel of other users on a multicast network and all other endpoints may be aware of the change in particular embodiments.

In particular embodiments, in-band controls (e.g., commands to radio 208) can utilize Internet Engineering Task Force (IETF) Request for Comments (RFC) 2833 and/or 4733, as well as RFC 2198. For example, control sequences may utilize RFC 2833/4733 embedded within RFC 2198 payloads. Of course, other suitable in-band controls and/or sequences can also be used in particular embodiments.

Different channels (e.g., 222) are shown in each soft radio (e.g., 216), whereby each channel can be turned on/off. Typically, a given radio can be tuned to the current channel, as selected by another radio on multicast network 202. In particular embodiments, "notification" may be used to communicate the selected channel information to other endpoints. This is because in such example scenarios, there may not necessarily be a mechanism to simply ask the radio to which station it is tuned. Accordingly, notification packets may be sent by a particular endpoint, such as the last soft radio to request a channel change.

In particular embodiments, any suitable controllable device can be used in place of radio 208. For example, a TV tuner for video on demand (VOD), or any other device capable of providing a variable source content stream can be accommodated. In addition, interoperability server 206 may define how many different channels are available from radio 208, and which of these channels may be made available to each endpoint. Further, such access to an available channel in a two-way environment may be accommodated by using permissions applicable to both transmitting and receiving. Accordingly, rules may be received in interoperability server 206 and provided to the respective endpoints, but access enforcement based on those rules can be implemented at each endpoint.

Figure 3:
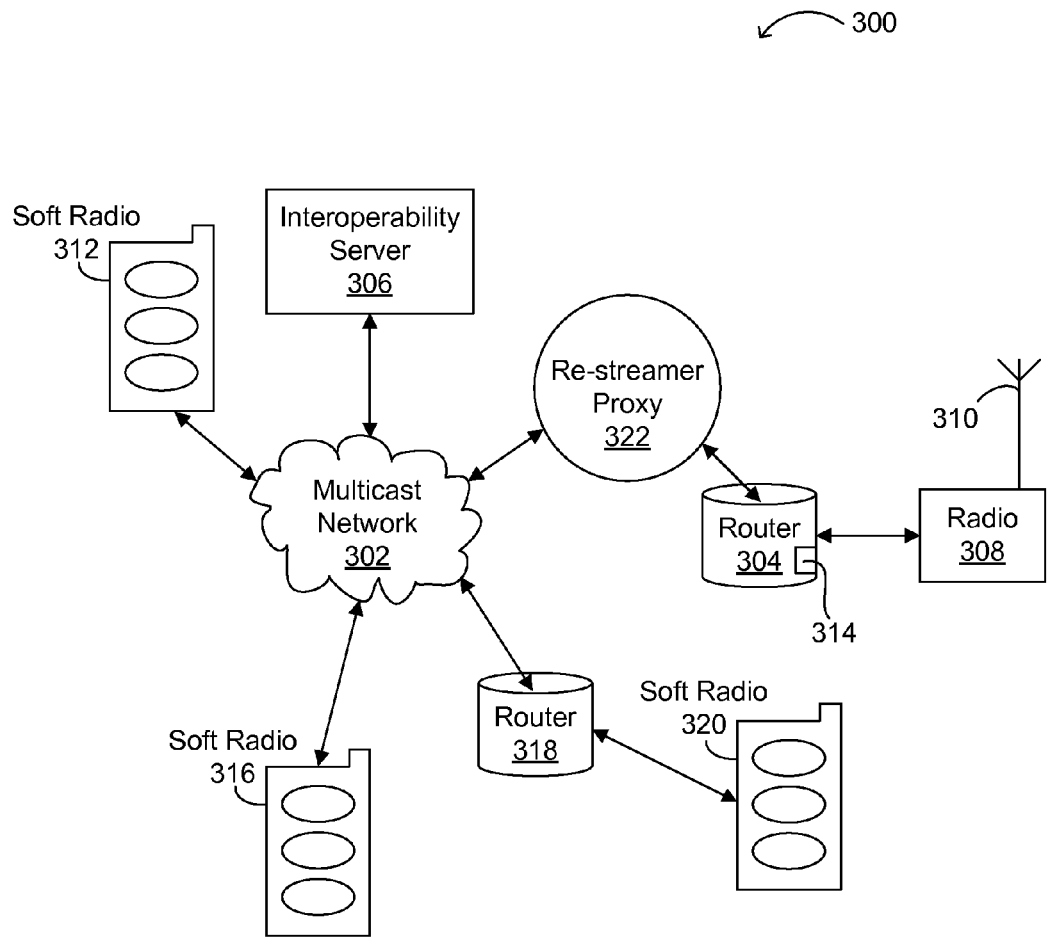
FIG. 3 illustrates an example radio application with a re-streamer/proxy.

Referring now to FIG. 3, an example radio application with a re-streamer/proxy is shown and indicated by the general reference character 300. Similar to the example discussed above in FIG. 2, the endpoints may be devices configured using an IP application as soft radios (e.g., 312, 316, and 320). Multicast network 302 can also interface with interoperability server 306, and routers 304 and 318. Radio 308 may be a physical base station radio with antenna 310, passing audio via LMRG 314 through router 304.

In addition to enforcement occurring at endpoints, a proxy agent (e.g., re-streamer or proxy 322) can be utilized, and may be logically configured between multicast network 302 and router 304. Thus in particular embodiments, even when there are third-party endpoints, appropriate enforcement of channel access can occur by using proxy 322. For example, one endpoint may be told to listen at IP address "239.1.2.55," but the actual IP address may be "239.1.2.99," which is where the actual audio traffic resides. Proxy 322 can forward the appropriate stream to "239.1.2.55," and may also decrypt where previously encrypted, for sending to a particular endpoint. Effectively, such a proxy may route incoming content at a particular address to another address, but the content itself may not be changed.

Generally, there can be one, two, or three or more levels of restriction: (i) server rules, as received in and stored within interoperability server 306; (ii) local rules/restrictions in each endpoint; and/or (iii) via proxy 322. Thus, access restriction levels can include server rules restricting access by providing configuration to an endpoint, the endpoint itself being programmed by a user to restrict access to certain channels (e.g., parental content control), and/or the proxy enforcing channel access, as discussed above. In this fashion, multiple layers or dimensions of variable source content stream access control can be accommodated. In addition, particular embodiments can include multiple such proxies, and/or may involve multiple passes through a same proxy. Accordingly, such a proxy can prevent unauthorized accesses using commands in-band with a media stream, for restricting and/or changing communications.

Figure 4:
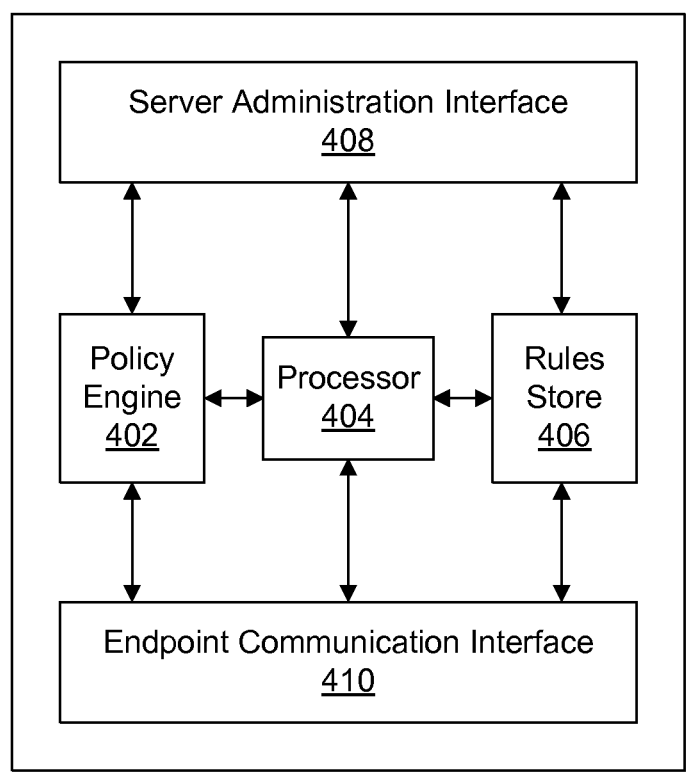
FIG. 4 illustrates example interoperability server components.

Referring now to FIG. 4, example interoperability server components are shown and indicated by the general reference character 400. For example, interoperability server 400 can include policy engine 402, processor 404, rules store 406, server administration interface 408, and endpoint communication interface 410. Rules store 406 can include channel or content access/permission rules for participating endpoints, where the rules may be input or programmed via server administration interface 408. Policy engine 402 can include additional constraints applied to the rules, such as available channels and procedures, other levels of restrictions, billing information, quality control, etc., resulting in permissions distributed to the endpoints via endpoint communication interface 410. Endpoint communication interface 410 can include any suitable IP-capable interface, and may send packets having in-band controls to participating endpoints.

Figure 5:
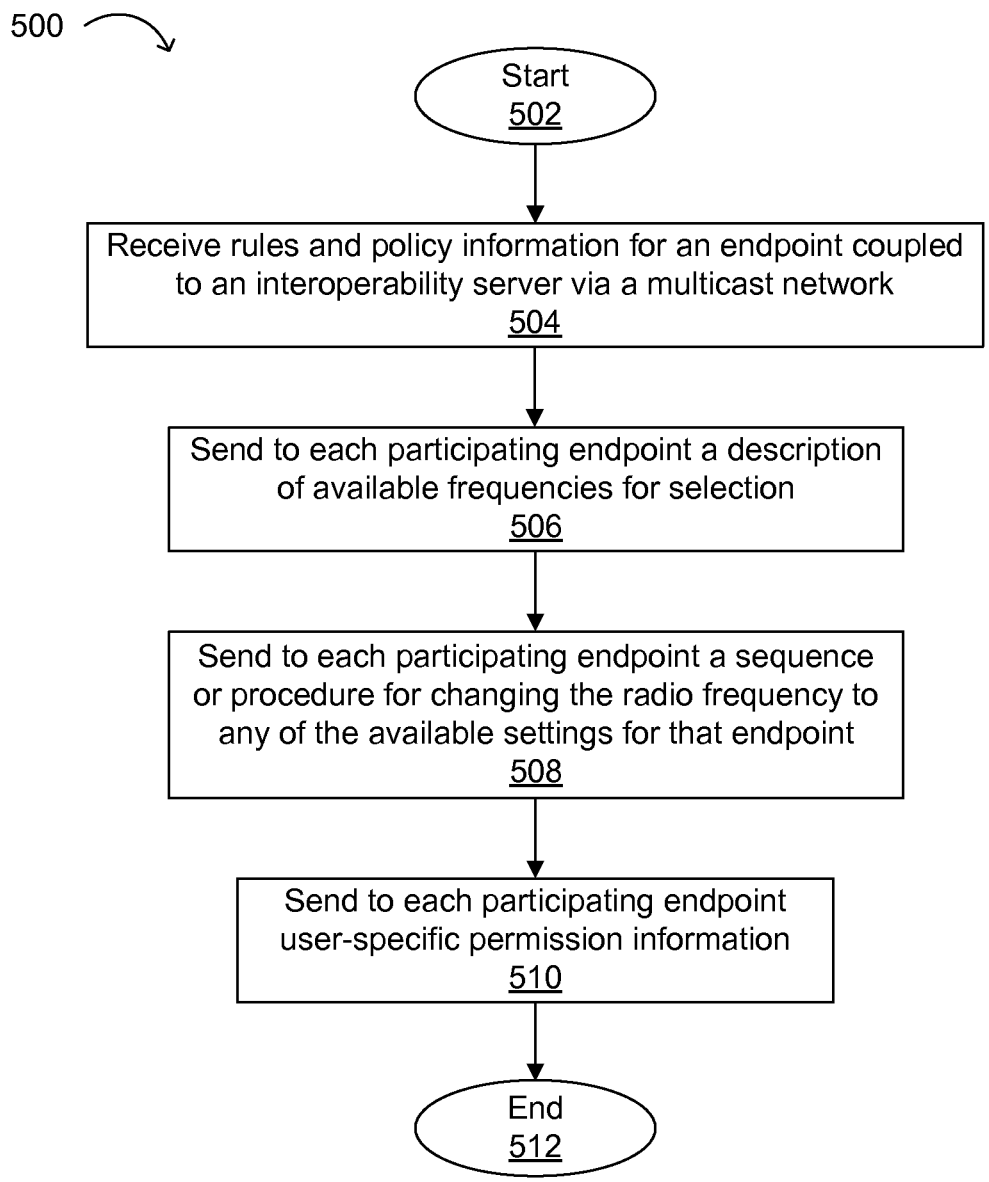
FIG. 5 illustrates an example endpoint configuration flow using an interoperability server.

Referring now to FIG. 5, an example endpoint configuration flow using an interoperability server is shown and indicated by the general reference character 500. The flow can begin (502), and rules and/or policy information can be received for an endpoint coupled to an interoperability server via a multicast network (504). The interoperability server can send to each participating endpoint a description of available frequencies for selection (506). The interoperability server can also send to each participating endpoint a sequence or procedure for changing the radio frequency to any of the available settings for that endpoint (508). In addition, the interoperability server can send to each endpoint user-specific permission information (510), and the flow can complete (512).

When a participating endpoint (e.g., endpoint "A") is to change a frequency to which an attached radio is tuned, the endpoint can first receive a description of all available content streams (e.g., frequencies) for any given stream source frequencies for any given radio, together with the RFC 2833/4733 control sequence for changing the radio frequency to each of the possible settings, as well as user-specific permission information. For example, such permission information may be distributed by an interoperability server, as discussed above.

Figure 6:
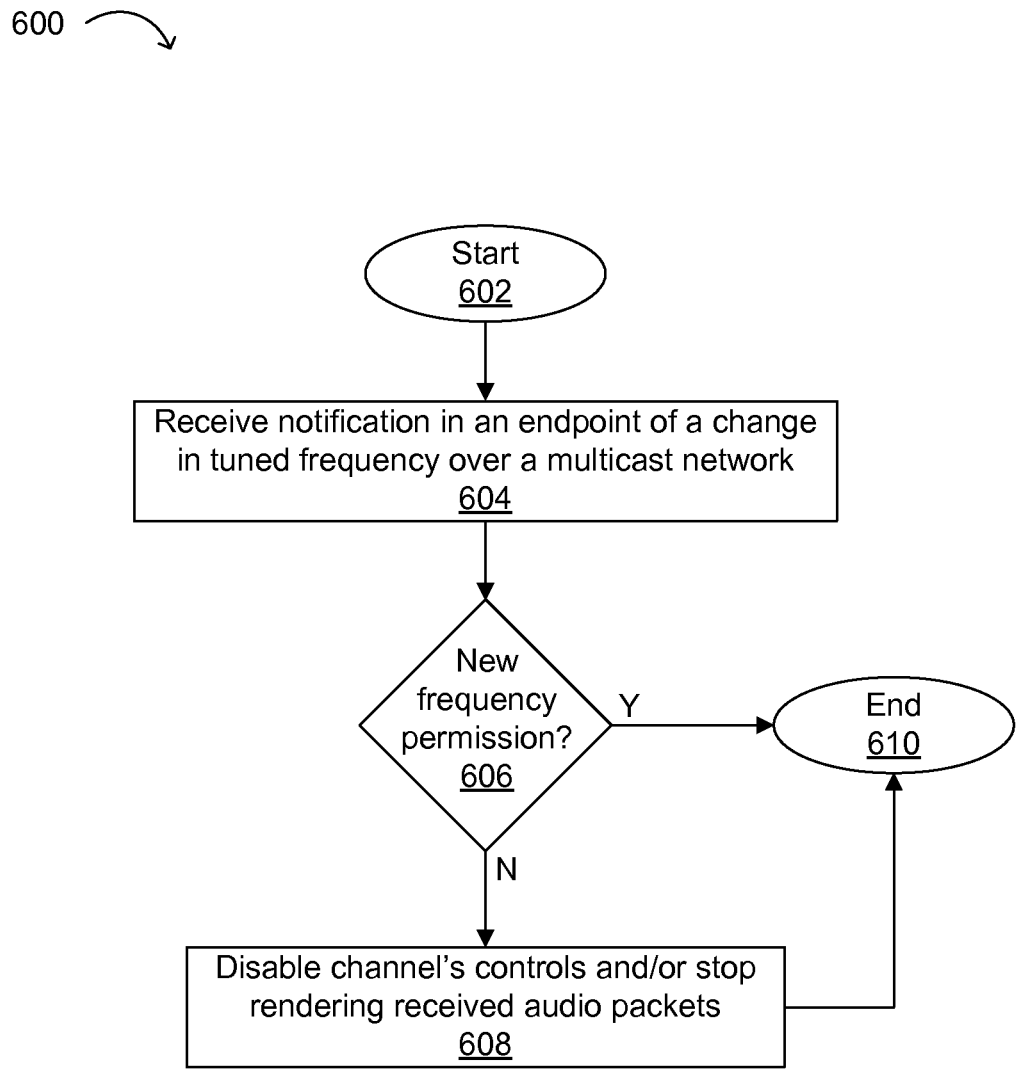
FIG. 6 illustrates an example endpoint frequency selection flow.

Referring now to FIG. 6, an example endpoint frequency selection flow is shown and indicated by the general reference character 600. The flow can begin (602), and notification can be received in an endpoint of a change in tuned frequency over a multicast network (604). If the endpoint has permission to access the newly selected frequency (606), the flow can complete (610). Such permission can be evaluated in the endpoint by comparing previously received permissions or rules from the interoperability server, and comparing against the newly selected content stream. However, if the endpoint does not have such permission (606), the endpoint can disable controls and/or stop local rendering received audio packets for that particular channel (608).

Thus in one example, a user of endpoint A can select a channel from those to which use is permitted by that user. Endpoint A can send the corresponding command packets on the multicast address defined for controlling the radio, which can ordinarily be the same address as an audio channel for the radio. In particular embodiments, this multicast address may also be the media address. This command can instruct the radio to change its tuned frequency. Other endpoints currently subscribed to the radio multicast address can receive and recognize the command sent by endpoint A, and can determine an associated result of the command. Alternatively, such endpoints can wait for notification of the change, as discussed above. If an endpoint receiving such notification does not have permission to hear and/or transmit on the newly selected frequency, that endpoint can disable the channel's controls and/or stop rendering received audio packets.

Figure 7:
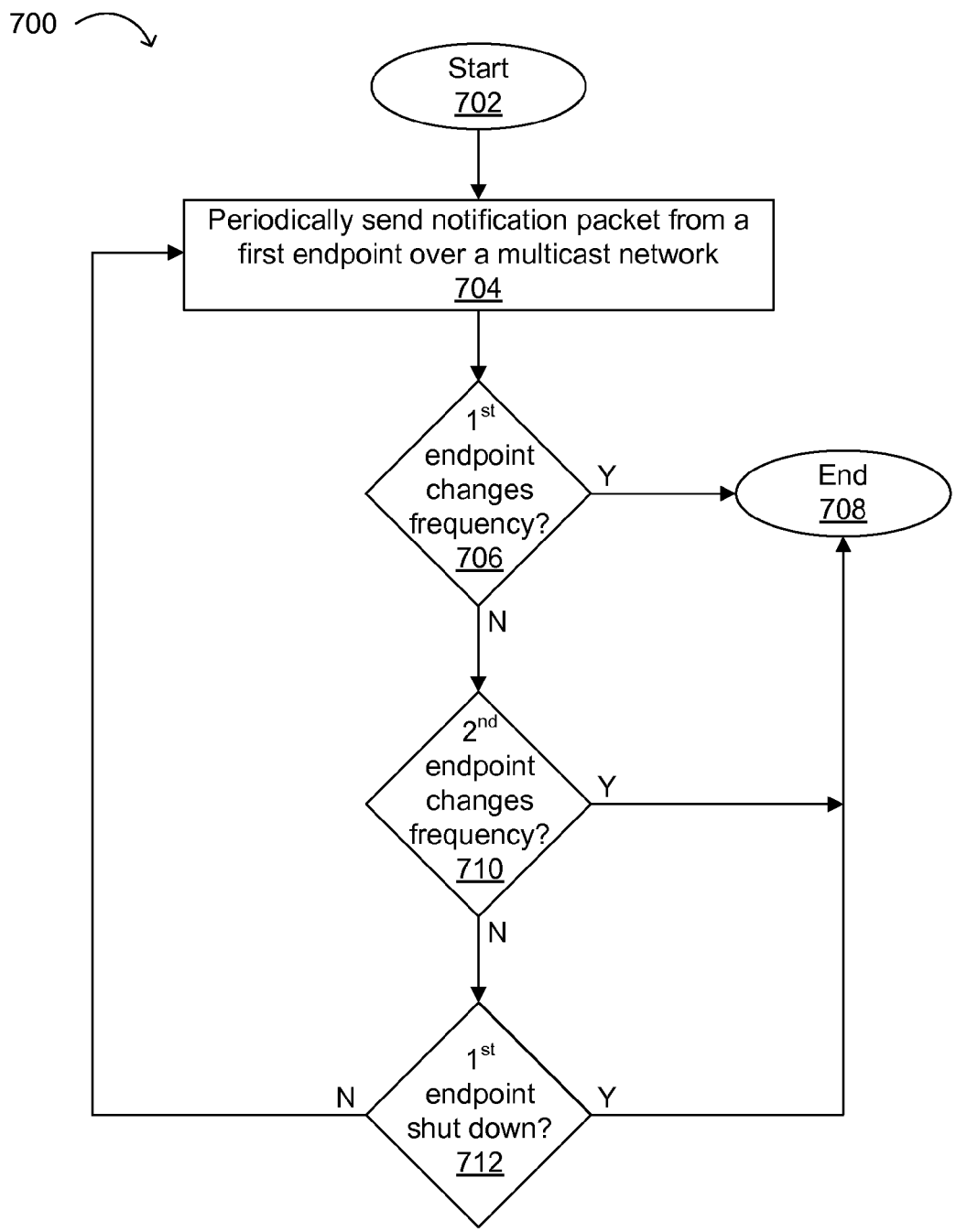
FIG. 7 illustrates an example notification flow.

Referring now to FIG. 7, an example notification flow is shown and indicated by the general reference character 700. The flow can begin (702), and a notification packet can be periodically sent from a first endpoint over a multicast network to a second endpoint (704). Such notification can continue until the first endpoint changes frequency (706), the second endpoint changes frequency (710), and/or the first endpoint shuts down (712), resulting in completion of the flow (708). If neither the first endpoint changes frequency (706), the second endpoint changes frequency (710), or the first endpoint shuts down (712), the notification packets can continue to be periodically sent (704).

Thus in one example, endpoint A can periodically send a notification packet on a multicast domain. For example, the notification packet may be a repetition of the command altered in a manner so as to make the packet non-actionable by the radio, yet understandable to an endpoint. The notification packet may be sent every n-seconds until at least one of the following cases occur: (i) endpoint A changes to a different frequency; (ii) another endpoint (e.g., endpoint "B") begins broadcasting that it has changed the radio to a different frequency, in which case endpoint A can stop transmitting the periodic notification; or (iii) endpoint A is shut down, in which case participating endpoints may timeout, and one participating endpoint can begin transmitting the notification in place of endpoint A. For electing a new "notifier," any suitable mechanism can be used, such as one applicable to regeneration of a token ring packet.

In one example scenario, the city of San Jose owns and operates a radio, which has four possible frequency selections: SWAT team, police dispatch, FBI command, and fire dispatch. Each frequency can be selected by sending different RFC-formatted commands to the multicast address associated with the radio. Users of the radio include Terry and Sam, who both work in the city police and fire dispatch center, and have access to the SWAT, police, and fire channels (but not the FBI channel).

In addition, Jerry, the FBI liaison to the city, has access to all the channels (including the FBI channel). A situation arises whereby Jerry needs to re-tune the radio to the FBI channel. Because the radio can only stream its audio to a single multicast address, by tuning the radio to the FBI channel, Terry and Sam will have access to the restricted channel. However, in particular embodiments, when Jerry uses his endpoint to re-tune the radio to the FBI channel, Jerry's endpoint also starts broadcasting (within the same multicast address) the fact that his endpoint last changed the radio to the FBI channel. Because Terry and Sam's endpoints hear that Jerry's endpoint changed the radio to a channel to which they do not have access, both Terry and Sam's endpoints squelch any received audio packets, thus not allowing Terry and Sam to listen to the FBI channel.

In particular embodiments, the permission controls can also allow some activities (e.g., transmit on the currently selected stream), but disallow the ability to change the channel. Also in particular embodiments, permissions can permit an endpoint to listen on the current channel, but cause a command to be sent prior to any transmission made by that user. Continuing with the example scenario above, Terry may be permitted to monitor the SWAT and FBI activity, but whenever Terry presses the button to transmit, the radio may first be commanded to switch to the police dispatch channel. This can allow the police dispatcher to relay commands as needed to the SWAT and FBI teams, but prevent Terry from interrupting or confusing the field operatives.

In another scenario, the dynamic switching described above may take place automatically. That is, the radio may be configured to revert to a specific radio frequency, regardless of the frequency used for any particular transmission. This information sent to the endpoints can allow the endpoints to know the radio source without the need for notification, and can also allow each endpoint to determine where any given utterance is directed. Thus, dynamic switching can allow for a SWAT commander to hear via an endpoint, but other SWAT team members may not hear from this endpoint. Such dynamic switching can occur while PTT is invoked (i.e., during talking), and then the radio can revert back to the previous channel.

In particular embodiments, the possible choices may not restrict permissions, and may be used by an endpoint only to provide for visual or audible notification of the current stream source. Thus, a visual switching indication can be provided for an endpoint.

In particular embodiments, and as discussed above, a re-streaming proxy can monitor the commands sent, and forward these packets to the actual address of a variable stream source (a different address) when a particular control or control set is used. The re-streamer may also elect (e.g., based on the commands observed) to start or stop forwarding stream content. For example, such a re-streamer can proxy commands and voice on one multicast address into the actual multicast address of an LMRG. Upon observing a command to change the source channel, the proxy can make a corresponding change to the stream from the LMRG. When the change channel command is observed, data from the radio can be blocked from being re-streamed to the address(es) being monitored by the endpoints, thus prohibiting listeners who do not know the secondary address from hearing the selected channel.

In particular embodiments, the proxy observing these commands can also authenticate the commands and deny those that it deems unauthorized. The proxy can then perform the function of the notifier, and send notification packets periodically. Further, any intermediary node (e.g., a proxy) can function similarly to an endpoint (e.g., turning off a stream it is not authorized to access) in particular embodiments.

In particular embodiments, RFC 2198 and RFC 2833/4733, or similar in-band controls, may be used to request a content change and/or notify listeners of current stream content. The use of in-band controls can eliminate or reduce the need for out-of-band controls, and may provide for near realtime communication of content. Particular embodiments may be compatible with any compliant endpoint, while non-compliant endpoints may be restricted from participation (e.g., listening) in the media stream via a proxy.

Particular embodiments can provide for synchronous operations, such that the moment a stream selection or control change is made, endpoints may be able to recognize this change and react within a suitable time sequence. In conventional approaches utilizing out-of-band signaling, significant synchronization may be required.

Particular embodiments may utilize relatively low overhead and/or bandwidth due to in-band function implementation. Since only one connection may be needed for the combined media stream control, only one connection may need to be negotiated for interoperation. In addition, media termination points may be made to behave intelligently, thus passing along control messages if authorized, blocking messages, and/or substituting alternative control signals were appropriate.

Although the description has been described with respect to particular embodiments thereof, these particular embodiments are merely illustrative, and not restrictive. For example, while particular arrangements of components and networks have been described, any suitable arrangement, such as those amenable to multicast networking, can be utilized in particular embodiments. In addition, while specific types of content streams and in-band controls have been described, any suitable media streaming and/or controls or packet format, such as real-time protocol (RTP), can also be utilized in particular embodiments. Further, while examples herein show a multicast network environment, one or more of the participating endpoints, proxies, and/or variable source stream devices may employ unicast or broadcast technologies with control traffic being distributed to all interested endpoints, proxies and variable source stream components.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method, comprising:
    receiving rules from an interoperability server at a plurality of endpoints coupled to a variable source content stream via a multicast network, wherein the plurality of endpoints include a first endpoint and a second endpoint, wherein at each endpoint in the plurality of endpoints that receives the variable source content stream, the rules are implemented and control access to the variable source content stream; and
    receiving, at each endpoint in the plurality of endpoints, using in-band controls of the variable source content stream via the multicast network:
        a description of content streams available for selection;
        a procedure for selecting an available content stream; and
        a notification sent by a peer that is accessing a same selected content stream, the notification including command packets that instruct the plurality of endpoints to change their tuned frequency, wherein the notification is periodically sent until the peer changes to a different frequency or another endpoint in the plurality of endpoints changes to another frequency, wherein each endpoint in the plurality of endpoints uses the rules to determine whether a channel is to be disabled such that particular content at the tuned frequency is not rendered or to determine whether the channel is rendered, and wherein the second endpoint is configured to use dynamic switching while push to talk is invoked at the second endpoint.

2. The method of claim 1, further comprising communicating with another endpoint via a unicast network.

3. The method of claim 1, further comprising configuring the first endpoint using an Internet protocol (IP) application.

4. The method of claim 1, wherein the description of the content streams available for selection comprises IP addresses.

5. The method of claim 4, further comprising using a proxy coupled to the multicast network for changing at least one of the IP addresses before sending to the first endpoint.

6. The method of claim 1, further comprising storing the rules in the interoperability server.

7. The method of claim 1, further comprising:
    periodically sending a notification packet from the first endpoint to the second endpoint until the first endpoint changes frequency, the second endpoint changes frequency, or the first endpoint shuts down, wherein the notification packet is non-actionable.

8. A method comprising:
    receiving notification at a first endpoint and a second endpoint, each endpoint coupled to a multicast network that includes a plurality of endpoints, the notification using in-band controls and indicating a change in content stream selection, wherein rules are implemented at each endpoint in the plurality of endpoints that receives the content stream selection and the rules controlling access for each endpoint that receives the content stream selection;
    determining, at each endpoint in the plurality of endpoints, a permission related to the selected content stream; and
    disabling access to the selected content stream at an endpoint if the endpoint lacks the permission for accessing the selected content stream, wherein the notification can be sent by a peer that is accessing the same selected content stream, the notification including command packets that instruct the plurality of endpoints to change their tuned frequency, wherein the notification is periodically sent until the peer changes to a different frequency or another endpoint in the plurality of endpoints changes to another frequency and wherein the second endpoint is configured to use dynamic switching while push to talk is invoked at the second endpoint.

9. The method of claim 8, further comprising communicating with another endpoint via a unicast network.

10. The method of claim 8, further comprising periodically sending the notification from the peer to the plurality of endpoints over the multicast network until:

the change in the content stream selection occurs in the plurality of endpoints; or the peer shuts down.

11. The method of claim 8, wherein the disabling access comprises disabling local rendering for the selected content stream.

12. The method of claim 11, wherein the receiving the notification comprises parsing a portion of a received packet.

13. The method of claim 8, further comprising receiving content in the first endpoint from a dynamically switched variable source content stream.

14. The method of claim 9, further comprising receiving an IP address from a proxy coupled to the multicast network.

15. The method of claim 14, further comprising modifying the IP address in the proxy before sending to the first endpoint.

16. The method of claim 8, further comprising selecting a new endpoint to provide the notification after the change in the content stream selection.

17. An apparatus, comprising: one or more processors; and
logic encoded in one or more non-transitory computer-readable media for execution by the one or more processors, and when executed operable to:
receive rules from an interoperability server at a plurality of endpoints, wherein the plurality of endpoints include a first endpoint and a second endpoint coupled to a variable source content stream via a multicast network, wherein at each endpoint in the plurality of endpoints that receives the variable source content stream, the rules are implemented and control access to the variable source content stream; and
receive, at each endpoint in the plurality of endpoints, using in-band controls of the variable source content stream via the multicast network:
a description of content streams available for selection; a procedure for selecting an available content stream; and a notification sent by a peer that is accessing a same selected content stream, the notification including command packets that instruct the plurality of endpoints to change their tuned frequency, wherein the notification is periodically sent until the peer changes to a different frequency or another endpoint in the plurality of endpoints changes to another frequency and wherein each endpoint in the plurality of endpoints uses the rules to determine whether a channel is to be disabled such that particular content at the tuned frequency is not rendered, and wherein the second endpoint is configured to use dynamic switching while push to talk is invoked at the second endpoint.

18. The apparatus of claim 17, further comprising a third endpoint coupled to the first endpoint via a unicast network.

19. The apparatus of claim 17, further comprising storing the rules in the interoperability server.

20. The apparatus of claim 17, wherein the first endpoint comprises a device configured with an Internet protocol (IP) application.

21. The apparatus of claim 17, wherein the description of the content streams available for selection comprises IP addresses.

22. The apparatus of claim 21, further comprising a proxy configured to change at least one of the IP addresses before being sent to the first endpoint.

23. An apparatus, comprising:
one or more processors; and
logic encoded in one or more tangible non-transitory media for execution by the one or more processors, and when executed operable to:
receive notification at a plurality of endpoints, wherein the plurality of endpoints include a first endpoint and a second endpoint, each endpoint coupled to a multicast network, the notification using in-band controls and indicating a change in content stream selection, wherein rules are implemented at each endpoint in the plurality of endpoints that receives the content stream selection and the rules controlling access for each endpoint that receives the content stream selection;
determine, at each endpoint in the plurality of endpoints, a permission related to the selected content stream; and
disable access to the selected content stream at an endpoint if the endpoint lacks the permission for accessing the selected content stream, wherein the notification can be sent by a peer that is accessing the same selected content stream, the notification including command packets that instruct the plurality of endpoints to change their tuned frequency, wherein the notification is periodically sent until the peer changes to a different frequency or another endpoint in the plurality of endpoints changes to another frequency and wherein the second endpoint is configured to use dynamic switching while push to talk is invoked at the second endpoint.

24. The apparatus of claim 23, wherein the access disabling comprises disabling local rendering for the selected content stream.

25. The apparatus of claim 23, wherein the permission determination comprises comparing the selected content stream against a predetermined value.

* * * * *